Patented Aug. 29, 1950

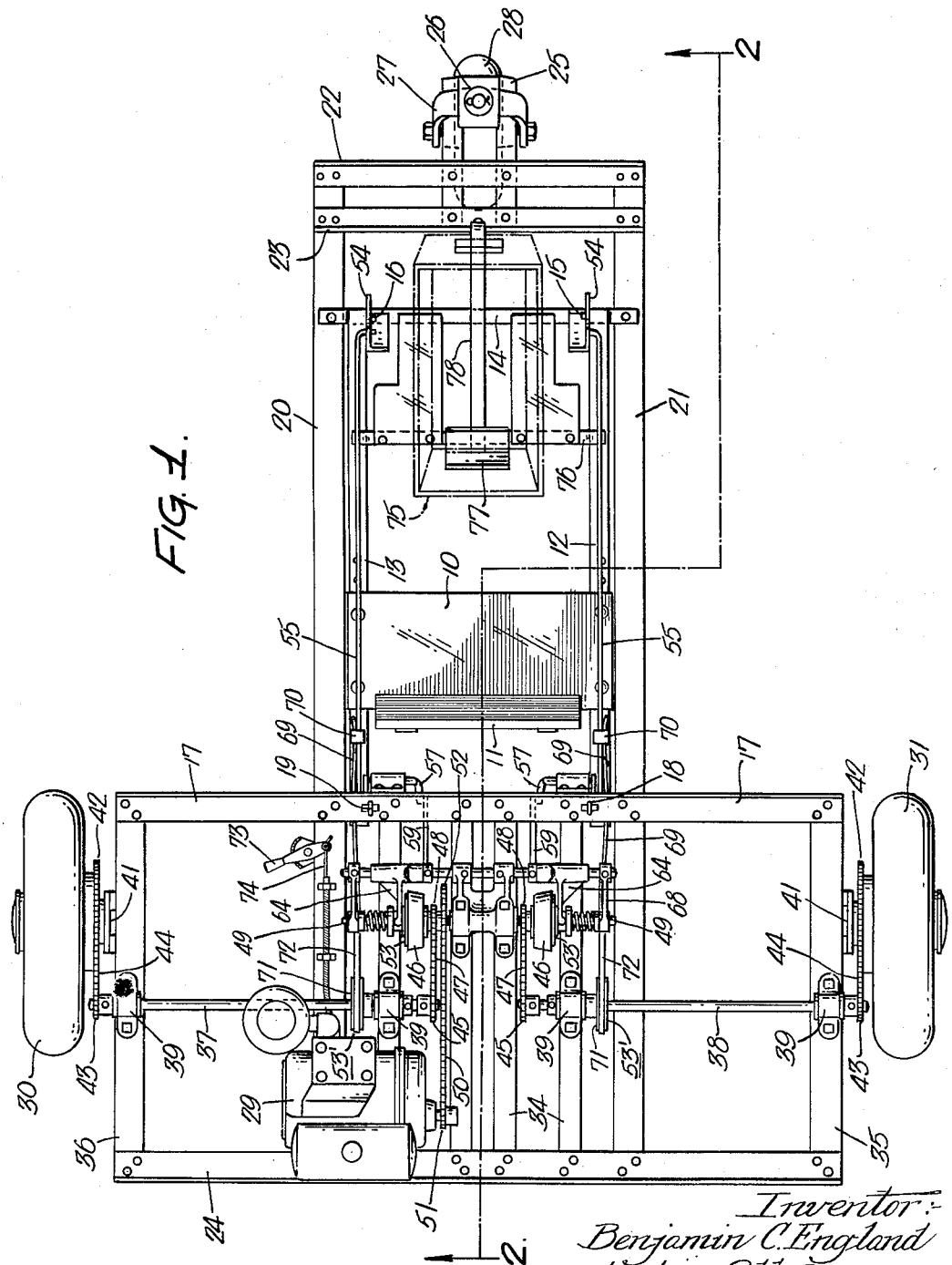

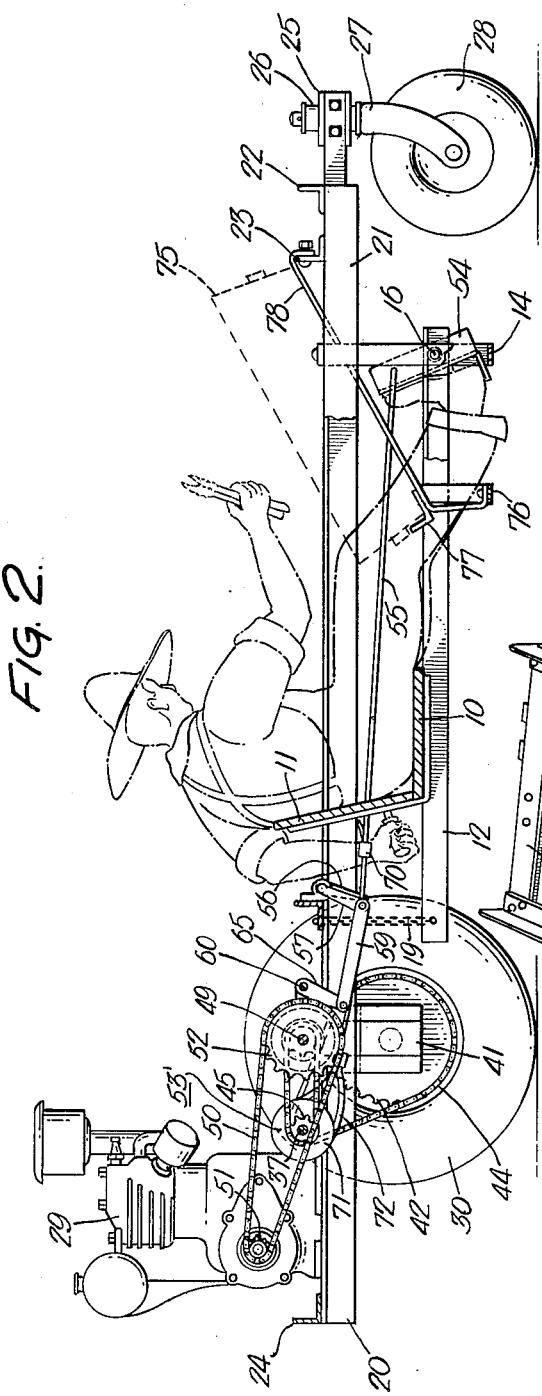

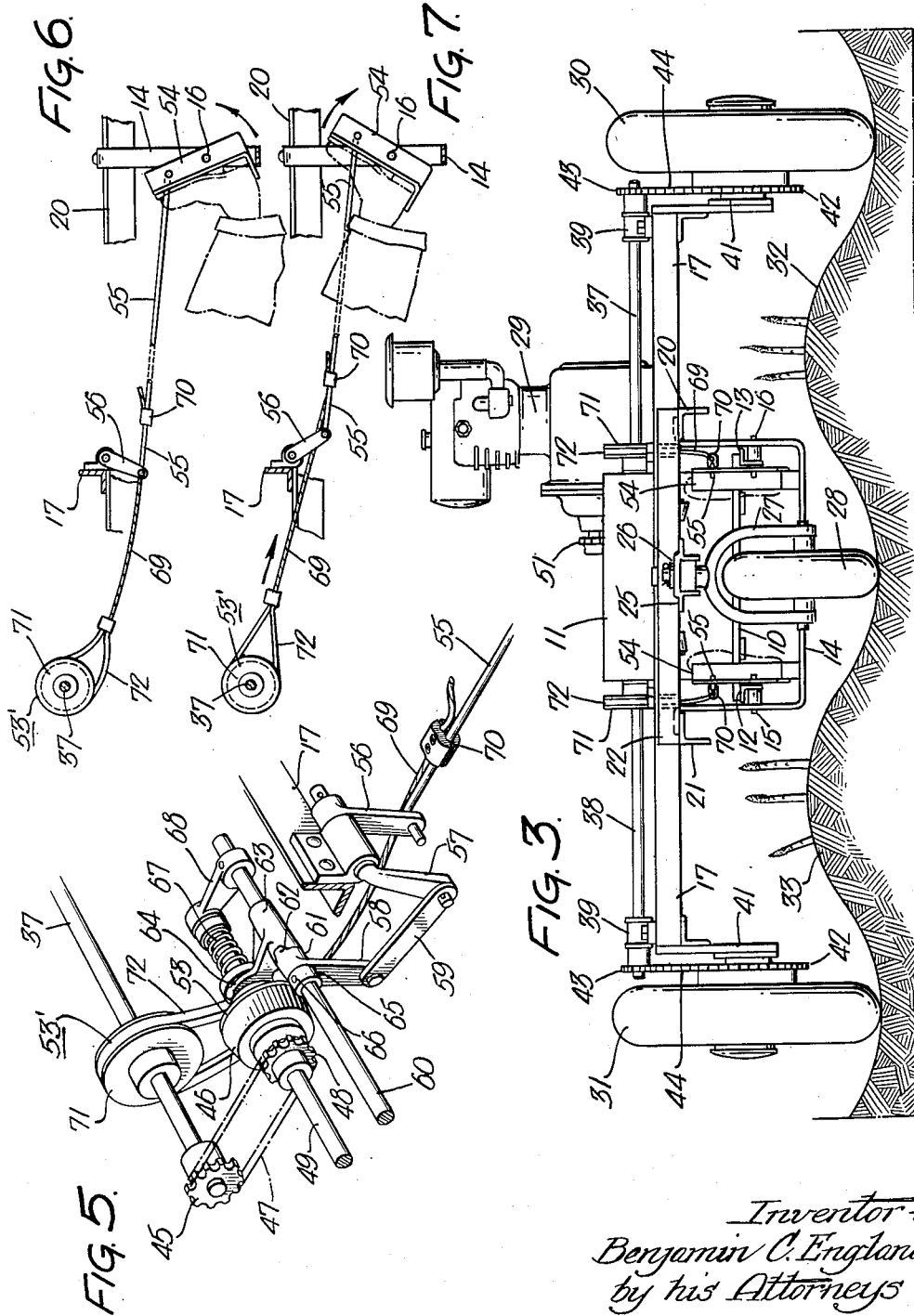

2,520,835

UNITED STATES PATENT OFFICE 2,520,835

HARVESTING TRACTOR AND DRIVE CONTROL THEREFOR

Benjamin C. England, Pedricktown, N. J.

Application July 24, 1947, Serial No. 763,211

5 Claims. (Cl. 180—6.62)

This invention relates to agricultural implements and especially to a powered vehicle enabling an operator to gather produce such as vegetables, asparagus and the like.

On large truck farms, I have found that there is a considerable loss of time and money entailed in the hiring of inexperienced help for harvesting produce such as asparagus. Frequently the entire crop ripens at once and it is therefore necessary that farmers having large vegetable fields hire seasonal help in order to harvest the crop at the proper time. Inexperienced harvesting help do a considerable amount of damage by trampling on the vegetables or the vines, and in the case of asparaus, this is particularly the case because, if the asparatus drill is stepped on at a point above a stalk which is invisible and yet within a short distance from the top of the soil, the particular stalk will be killed entirely or it will reverse its direction of growth and turn back down into the earth. It has been found utterly impossible to train asparagus pickers not to walk on the drills even though no stalks are visible. Furthermore, the efficiency of the average asparagus picker is not high, and since there is a certain special technique in cutting the asparagus stalks below the surface of the soil, an additional element of loss is present because the farmer cannot properly train or supervise the caliber of help which he is obliged to hire to insure efficient picking.

The annular loss to large asparagus planters both from damage to the growing stalks and from improper cutting has been estimated to be as high as one-third to one-half of the possible yield.

An object of the invention, therefore, is to provide a self-propelled vehicle adapted to be driven between asparagus drills or rows of vegetables which supports the picker in a convenient position for harvesting the crop.

A further object of the invention is to provide a garden tractor for use in the harvesting of vegetables and the like which permits greatly increased harvesting efficiency by reducing fatigue, increasing the speed with which vegetables may be gathered and in providing a carrier for the harvested crop.

A still further object of the invention is to provide a three wheeled garden tractor for the purpose described which can be controlled entirely by the picker's feet, leaving his hands free for the harvesting operation.

Further objects are apparent from the specification and drawing in which:

Fig. 1 is a plan of the powered tractor constructed in accordance with the invention;

Fig. 2 is a section taken along the lines 2—2 of Fig. 1;

Fig. 3 is a rear view of the structure of Fig. 1;

Fig. 4 is a detail of the frame construction of the tractor;

Fig. 5 is an enlarged detail of the driving and clutch mechanism; and

Figs. 6 and 7 show the operation of the clutch and brake by means of the picker's feet, Fig. 6 showing the clutch in the engaged position and Fig. 7 the clutch in the disengaged position.

The invention comprises essentially a self-propelled three-wheeled vehicle having the transverse spacing between the wheels corresponding with the distance between vegetable rows and with the wheels supported from a frame high enough above the wheel centers to straddle growing vegetables.

An underslung chair is adjustably suspended from the frame and is adapted to carry a picker in a sitting position only a slight distance above the ground and between the two rows or drills overlapped by the driving wheels. Propulsion is furnished by means of an engine mounted on the frame near the driving axles, and a rack for conveniently supporting a carrier for picked vegetables is provided near the front wheel. Each driving wheel has an individually operated clutch and brake which are controlled by separate foot pedals mounted in spaced relation with the picker's chair. Manipulation of the pedals serves both to drive and to steer the vehicle in any desired direction.

Referring now more particularly to the drawings, a seat having a bottom portion 10 and a back 11 is adjustably mounted on subframe rails 12 and 13 which are in turn pivoted at their forward ends to hanger 14 by means of pivots 15 and 16. The rearward extremities of rails 12 and 13 are supported from cross-member 17 by means of chains 18 and 19 to provide vertical adjustment for rails 12 and 13 with respect to the main frame of the tractor.

The main frame is constructed from a pair of longitudinal frame members 20 and 21 to which are attached a series of cross members 22, 23, 17 and 24. Cross members 22 and 23 are attached to the main frame rails at the forward end of the tractor and carry near their midpoints a central forwardly extending member 25 having a bearing 26 which receives the pintle of yoke 27 on front wheel 28. The forward wheel 28 is provided with caster in order to facilitate steering and tracking.

The main rails extend rearwardly behind the picker's seat 11 and support the power plant of the vehicle which is shown as a conventional gasoline engine 29 mounted on a platform comprising cross members 17 and 24 which extend laterally beyond rails 20 and 21 and the width of these members is such that power wheels 30 and 31 are spaced apart from each other a distance equivalent to rows or drills of asparagus as shown in Fig. 3. Front wheel 28 positioned centrally of the tractor will therefore ride between the two drills 32 and 33 which are straddled by wheels 30 and 31. Motor 29 is mounted between cross members 17 and 24 to which additional members 34 may be bolted along with end members 35 and 36 to provide additional rigidity and mounting facilities. A pair of jackshafts 37 and 38 are mounted on members 34, 35 and 36 by means of trunnion bearings 39. The driving wheels 30 and 31 rotate on stub axles 40 welded to brackets 41 which depend from rails 35 and 36 and are driven from jack shafts 37 and 38 through wheel sprockets 42, shaft sprockets 43 and driving chains 44. The inboard end of each jackshaft is provided with a sprocket 45 which connects each shaft with clutches 46 by means of chains 47 and countershaft sprockets 48 mounted on countershaft 49. Drive from the motor 29 to countershaft 49 is provided through chain 50 mounted on engine sprocket 51 and countershaft sprocket 52 which is keyed to shaft 49.

The power transmission and steering of the vehicle is accomplished entirely by means of friction clutches 46 having driven cones 53 non-rotatably splined to shaft 49. The operation of each clutch is the same and is controlled by means of foot pedals 54 pivoted at 15 and 16 and connecting with rods 55 which operate one arm of double bell cranks 56 mounted on cross member 17. It will be understood that the construction of each clutch and its associated mechanism is the same and that a description of only one refers to both. The other arm 57 of the bell crank is operatively connected to lever 58 by means of link 59. Rod 60 mounted on members 20 and 21 supports lever 58 which has a sleeve portion 61 with a pair of cams 62 adapted to cooperate with mating cam recesses in the shank 63 of clutch throwout yoke 64. Axial movement of lever 58 on shaft 60 is prevented by means of fixed collars 65 attached thereto by means of set screws 66. Movement of pedal 54 serves to turn lever 68 on shaft 60, thereby moving clutch yoke 64 axially of shaft 60 to disengage clutch 46 against pressure of clutch spring 67 which is retained axially by means of link 68 rigidly attached to countershaft 49 and shaft 60.

Operation of pedal 54 also serves to apply brakes 53' on jackshafts 37 and 38 by means of cable 69 secured to rod 55 by clamp 70. The brake shown in Fig. 5 comprises a pulley 71 keyed to countershaft 37 around which a V belt 72 is mounted and attached to cable 69. When clutch 46 is engaged (Fig. 6) cable 69 is slack and belt 72 rides freely in the groove of pulley 71. However, disengagement of the clutch (Fig. 7) by operation of pedal 54 may also serve to apply brake 53' automatically since cable 69 becomes taut to apply tension to the V belt 72 thereby exerting braking pressure between it and pulley 71.

It will be apparent that clamp 70 may be adjusted so that no braking force is applied to the jackshafts when clutch 46 is engaged; but when the clutch is disengaged by means of the initial travel of pedal 54, a neutral position is reached in which no tension is exerted on cable 69 and the clutch continues to be disengaged. Further actuation of pedal 54 then serves to apply the brake in proportion to the additional pedal pressure applied by the operator.

Since jackshafts 37 and 38 are not connected, it will be apparent that the clutch for each shaft may be operated selectively so that one wheel of the tractor may be held in a stationary or braked position by means of its pedal and the other wheel turned, thereby pivoting the entire tractor around the stationary wheel. Suitable operation of each pedal steers the vehicle in any desired direction simply by engaging either or both of the driving wheels to any relative degree. Engagement of both clutches drives the vehicle forward in a straight line without requiring other steering because the sprocket ratios of each wheel are identical.

Speed control of motor 29 is provided by means of hand lever 73 connected to the engine throttle (not shown) by means of push-pull cable 74.

The construction of the vehicle includes a convenient position for a carrier 75 adapted to receive the picked vegetables. Hanger 76 is suspended from rails 12 and 13 and centrally supports a bracket 77 attached to cross member 23 by means of brace 78. Bracket 77 is fabricated from a piece of angle iron and forms a pocket adapted to receive carrier 75.

The construction of the vehicle is designed primarily for the convenience of the picker because the underslung rails 12 and 13 permit him to be carried at any desired elevation from the ground in order that he may reach the vegetables to be picked with a minimum of effort. The foot control eliminates the necessity for the picker to use his hands for anything other than the picking operation and the provision of a conveniently located receptacle for receiving picked vegetables adds to the efficiency of the entire operation.

The use of the vehicle enables a small number of experienced pickers to do the work of many less efficient pickers and, although the actual cutting of the stalks must be done by hand, all damage to plants due to trampling is eliminated. Greatly increased harvesting efficiency is thereby obtained.

Furthermore, the vehicle is inexpensive and adapted to utilize many standard components such as the motor and wheels. It is especially adapted for the gathering of asparagus because of the peculiar nature of this crop, but it may be readily employed for other produce.

I claim:

1. An agricultural vehicle comprising a frame, drive wheels mounted at opposite sides of the frame and disposed for travel in the valleys outwardly adjacent two vegetable drills, a lead wheel on said frame spaced from said drive wheels and disposed for travel in the valley between said two drills, means to support a picker in suspended relation with reference to the main frame between said two vegetable drills, a motor mounted on a portion of the frame rearwardly of said means, driving connections from said motor to each of said drive wheels and including a clutch; and means selectively operable by the feet of the picker to actuate said clutches and thereby independently control application of power to said drive wheels while the picker's hands are entirely free for harvesting the vegetables growing in said drills.

2. In agricultural vehicle construction, a garden tractor having a main tractor frame, a platform mounted at the rear of said frame, a pair of vertical brackets depending from either side of said platform, a stub axle attached to each of said brackets, a driving wheel mounted on each of said stub axles and laterally spaced with respect to each other so that the platform straddles two adjacent vegetable rows, a forward wheel centrally mounted from the frame to travel between the two rows, a subframe suspended from the main frame, a seat carried by the subframe, a motor mounted on the platform, a pair of jackshafts mounted on the platform, a countershaft mounted on the platform, driving means between the outer ends of the jackshafts and the driving wheels, a pair of clutches operatively associated with the countershaft, said clutches having a driven member and a driving member, driving means between the driven member of each clutch and its cooperating jackshaft, driving means between the motor and the driving member of each clutch, a brake keyed to each jackshaft, a pair of foot pedals mounted longitudinally ahead of the seat, connections associated with the foot pedals for operating each clutch selectively, and a brake applying connection clamped to each of said clutch connections whereby the brake and clutch for each wheel is independently actuated by means of its associated pedal.

3. In agricultural vehicle construction, a garden tractor comprising a main tractor frame, a pair of driving wheels mounted on said frame and widely spaced to straddle rows of growing produce, at least one forward wheel mounted on the frame, the frame being mounted above the centers of the driving wheels to provide clearance between the frame and the growing produce in the space inwardly of each drive wheel, a subframe suspended centrally from the main frame so as to be disposed between the rows of growing produce, an operator's seat carried by the subframe within reach of the surface of the garden, and steering means operable from said seat for controlling the relative speed of the driving wheels.

4. An agricultural implement constructed in accordance with claim 3, in which the forward wheel is castered, free swiveling, and centrally mounted on the frame.

5. In agricultural vehicle construction, a garden tractor comprising a main tractor frame, a pair of driving wheels mounted on said frame and widely spaced to straddle rows of growing produce, at least one forward wheel mounted on the frame, the frame being mounted above the centers of the driving wheels to provide clearance between the frame and the growing produce in the space inwardly of each drive wheel, a subframe suspended centrally from the main frame so as to be disposed between the rows of growing produce, an operator's seat carried by the subframe within reach of the surface of the garden, a motor mounted on the main frame on a portion thereof rearwardly of the seat, a pair of jackshafts mounted on said portion of the main frame, means including a pair of clutches for transmitting power from the motor to each of the jackshafts, and a pair of pedals connected to each of said clutches and mounted on the subframe forwardly of the seat whereby power may be selectively applied to the jackshafts.

BENJAMIN C. ENGLAND.

REFERENCES CITED

The following references are of record in the file of this patent:

UNITED STATES PATENTS

| Number | Name | Date |
|---|---|---|
| 716,735 | Mitchell et al. | Dec. 23, 1902 |
| 959,851 | Gerber | May 31, 1910 |
| 1,340,759 | Duncan | May 18, 1920 |
| 1,380,609 | Ullrich | June 7, 1921 |
| 1,819,624 | Ronning et al. | Aug. 18, 1931 |
| 2,261,354 | Fee | Nov. 4, 1941 |
| 2,377,959 | Peters | June 12, 1945 |
| 2,378,847 | Harris | June 19, 1945 |